Jan. 20, 1931.  S. I. FEKETE ET AL  1,789,381
AUTOMOBILE BODY
Filed May 13, 1925
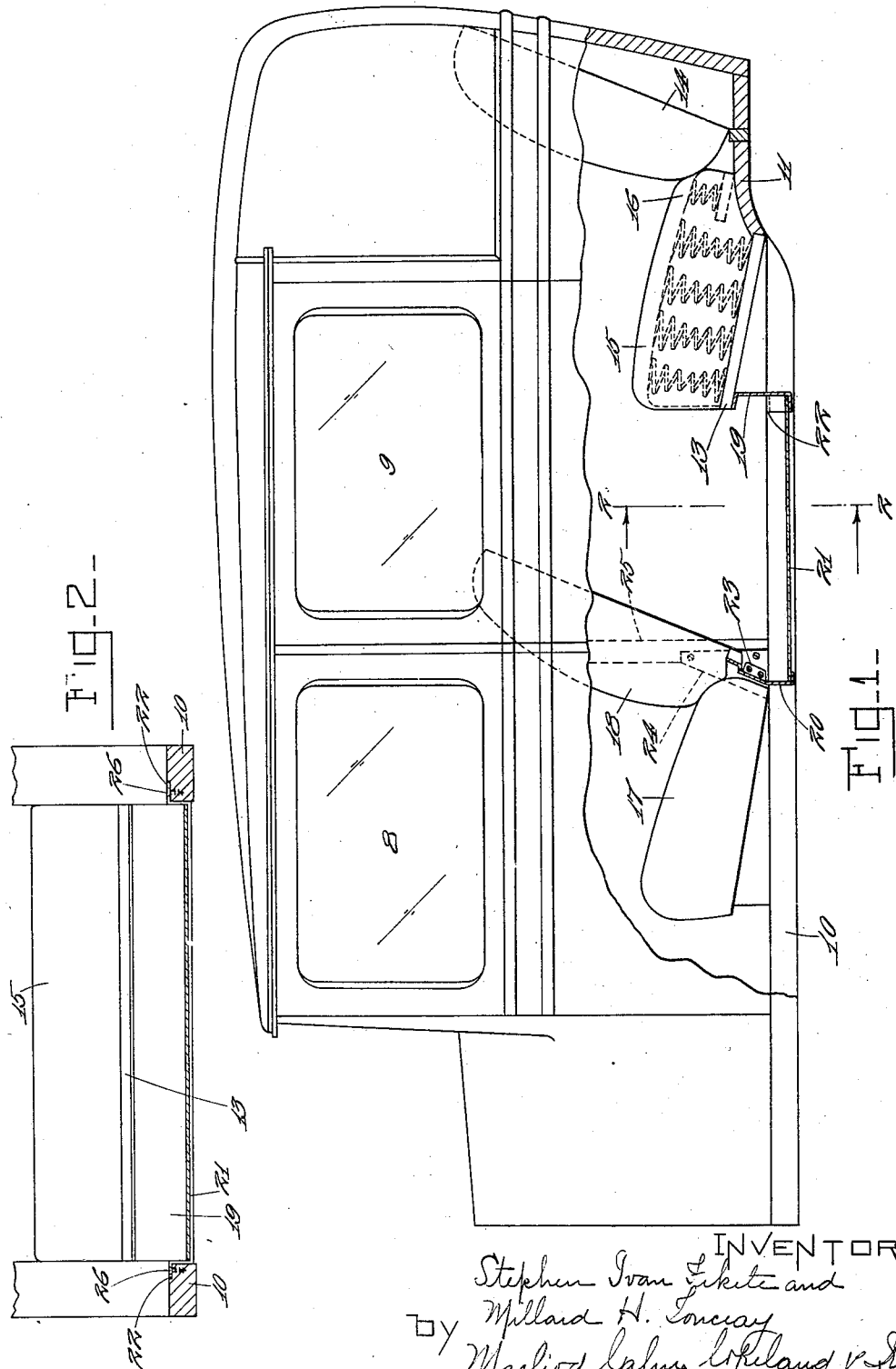

Patented Jan. 20, 1931

1,789,381

UNITED STATES PATENT OFFICE

STEPHEN IVAN FEKETE AND MILLARD H. TONCRAY, OF DETROIT, MICHIGAN, ASSIGNORS TO HUDSON MOTOR CAR COMPANY, OF DETROIT, MICHIGAN, A CORPORATION OF MICHIGAN

AUTOMOBILE BODY

Application filed May 13, 1925. Serial No. 29,882.

This invention relates to automobile bodies and especially, although not exclusively, to closed bodies of the sedan type. It has for its general object to decrease the overall dimensions of the body in proportion to the available space in the interior thereof, and more particularly to lower the height of a relatively low hung body and also to shorten its length without materially decreasing the head and leg room afforded the occupants.

The foregoing and other objects of the invention, together with means whereby the latter may be carried into effect, will best be understood from the following description of one form or embodiment thereof illustrated in the accompanying drawings. It will be understood, however, that the particular construction described and shown has been chosen for illustrative purposes merely, and the invention, as defined by the claims hereunto appended, may be otherwise embodied without departure from its spirit and scope.

In said drawings:

Fig. 1 is a side elevation, partly broken away, of the complete body.

Fig. 2 is a detail transverse section taken substantially on the line 2—2, Fig. 1.

The invention is herein shown as embodied in a sedan body having front and rear doors 8 and 9 and longitudinal side sills 10 to the rear ends of which are secured upwardly curved brackets 11 constituting upwardly offset portions of said sills which conform substantially to the usual "kick-up" of the chassis frame over the rear axle of the vehicle. It is customary in an automobile body of this type, in order that the rear seat may be located sufficiently far back in the body, to support said seat at its rear edge substantially on a level with or above the upwardly offset portions of the body sills. In accordance with the present invention the position of the rear seat is lowered, thereby permitting a lowering of the top of the body without decreasing the available head room. In order to accomplish this, advantage is taken of the fact that the occupant of a seat of this character sits thereon somewhat forward of the back thereof, the extreme rear portion of the seat not being engaged by him or called upon to support his weight. Accordingly, the body portion of the rear seat cushion need not extend entirely to the back of the seat but may stop forwardly thereof. In accordance with the present invention and in the embodiment herein shown, there is employed a rear seat stool or support 13 which is located with its rear edge substantially on a level with the tops of the main portions of the sills 10 at the junction thereof with the offset portions 11. The back 14 of the rear seat is supported with its lower edge substantially on a level with the tops of the offset portions 11 at the rear of the junction thereof with the main portions of the sills. Resting upon the support 13 is a seat cushion whose main or body portion 15, which supports the occupant, may be upholstered in the usual manner and terminates at the rear edge of the support 13 forwardly of the back 14. Said cushion is formed with a rear extension 16 of reduced thickness which extends over the offset portions 11 of the sills and fills the space between the forward or body portion of said cushion and the back 14. Since the extension 16 is not called upon to support the weight of the occupant of the seat, its reduced thickness is not objectionable and it may be stuffed or upholstered in any suitable way which will enable it to hold its shape even though less soft than the body portion of the seat. In this manner the height of the rear seat may be reduced by the height of the offset portions of the body sills, permitting a corresponding reduction in the overall height of the body.

The front seat 17 is also supported with its rear or lower edge substantially on a level with the tops of the sills 10, said edge being located slightly in advance of the rear surface of the front seat back 18, thereby, in effect, undercutting the rear of the front seat as a whole adjacent the floor of the vehicle to provide toe space for the occupants of the rear seat, and permitting a corresponding reduction in the overall length of the body, as hereinafter more fully explained.

In order to compensate for the reduction in vertical leg room afforded the occupants of the rear seat by the lowering of the latter, as above described, the floor of the vehicle between the front and rear seats is correspondingly lowered. To this end, said floor preferably comprises a metallic pan which depends below the tops of the sills 10. In the construction shown there are employed two brackets 19 and 20 depending respectively from the front of the rear seat and the rear of the front seat to a level below the tops of the sills and supporting a plate 21 which constitutes the floor of the vehicle between said seats. The bracket 19 may be bolted to the underside of the rear seat support 13 and is preferably formed at its ends with flanges 22 secured, as by screws 26 to the tops of the sills 10. The bracket 20 may be secured at its upper edge to the underside of the front seat back 18 and may be provided at its ends with ears 23 bolted to a palte 24 secured to body uprights 25 and to the sills 10. Said bracket 20 is undercut to correspond in form with the undercut arrangement of the front seat and to provide the toe room above referred to adjacent the depressed floor 21.

It will be seen that, notwithstanding the lowering of the rear seat as above described, the occupants thereof are nevertheless able to assume substantially the same sitting position as in the usual car of this type, the depressed floor 21 compensating for the reduction in height of the seat and permitting the undercutting of the front seat and of the bracket 20 to afford additional toe room without material change in the design of said front seat, and particularly without shortening the back of the latter. This undercutting, in turn, not only permits a shortening of the overall length of the body, but also permits the location of the effective portion of the rear seat forward of the "kick-up", thereby making possible the lowering of the latter in the manner described. It will therefore be seen that the several features described cooperate with one another in contributing to the general result accomplished, namely, the reduction of the overall dimensions of the body without impairing the comfort of the occupants or their convenience in entering and leaving the car. In the latter connection it will be observed that access to the rear seat is obtained through the rear doors 9, which are located over the sills 10, and that the passenger, in entering, steps from the running board over the sill and directly upon the depressed floor 21, it being unnecessary for him to step upon the sill.

Having thus described our invention, we claim:

1. In an automobile body, the combination with longitudinal sills having upwardly offset portions adjacent their rear ends, of a rear seat having a body portion with its rear lower edge substantially on a level with the tops of the main portions of said sills at the junction thereof with said offset portions, and a back for said seat whose lower edge is substantially on a level with said offset portions, said seat having a rear extension of less thickness than said body portion and filling the space between the latter and said back.

2. In an automobile body, the combination with longitudinal sills having upwardly offset portions adjacent their rear ends, of a rear seat support having its rear edge substantially on a level with the tops of the main portions of said sills at the junction thereof with said offset portions, a rear seat back having its lower edge subtantially on a level with said offset portions, and a seat cushion on said support having a rear extension of reduced thickness filling the space between the forward portion of said cushion and said back.

3. In an automobile body, the combination with longitudinal sills having upwardly offset portions adjacent their rear ends, of a floor located at a level below the tops of said sills, a rear seat having a body portion with its rear lower edge substantially on a level with the tops of the main portions of said sills at the junction thereof with said offset portions, and a back for said seat whose edge is substantially on a level with said offset portions, said seat having a rear extension of less thickness than said body portion and filling the space between the latter and said back.

4. In an automobile body, the combination with longitudinal sills having upwardly offset portions adjacent their rear ends, of a floor located at a level below the tops of said sills, a rear seat having a body portion with its lower forward edge adjacent the rear of said floor and its rear lower edge substantially on a level with the tops of the main portions of said sills, and a back for said seat whose lower edge is substantially on a level with said offset portions.

In testimony whereof we affix our signatures.

STEPHEN IVAN FEKETE.
MILLARD H. TONCRAY.